United States Patent
Zhang et al.

(10) Patent No.: US 12,032,558 B2
(45) Date of Patent: **\*Jul. 9, 2024**

(54) BLOCKCHAIN MAINTENANCE METHOD AND APPARATUS, SERVER, AND COMPUTER-READABLE STORAGE MEDIUM

(71) Applicant: Huawei Cloud Computing Technologies Co., Ltd., Guizhou (CN)

(72) Inventors: Yu Zhang, Beijing (CN); Ziyi Zhang, Beijing (CN); Zechao Meng, Shenzhen (CN); Yue Yu, Beijing (CN)

(73) Assignee: HUAWEI CLOUD COMPUTING TECHNOLOGIES CO., LTD., Guizhou (CN)

( \* ) Notice: Subject to any disclaimer, the term of this patent is extended or adjusted under 35 U.S.C. 154(b) by 848 days.

This patent is subject to a terminal disclaimer.

(21) Appl. No.: 17/000,874

(22) Filed: Aug. 24, 2020

(65) Prior Publication Data

US 2020/0387503 A1    Dec. 10, 2020

Related U.S. Application Data

(63) Continuation of application No. PCT/CN2019/081181, filed on Apr. 3, 2019.

(30) Foreign Application Priority Data

Jun. 30, 2018  (CN) .......................... 201810706248.8
Jul. 20, 2018  (CN) .......................... 201810806654.1

(51) Int. Cl.
*G06F 16/00* (2019.01)
*G06F 16/23* (2019.01)
(Continued)

(52) U.S. Cl.
CPC ......... *G06F 16/2379* (2019.01); *G06Q 10/10* (2013.01); *G06Q 50/18* (2013.01); *H04L 9/3268* (2013.01)

(58) Field of Classification Search
CPC .... G06F 16/2379; G06Q 10/10; G06Q 50/18; H04L 9/3268
See application file for complete search history.

(56) References Cited

U.S. PATENT DOCUMENTS 10,320,843 B1 \* 6/2019 Dobrek ................. H04L 9/0822
11,451,530 B2 \* 9/2022 Padmanabhan ..... G06F 21/6245
(Continued)

FOREIGN PATENT DOCUMENTS

| CN | 105430767 A | 3/2016 |
|---|---|---|
| CN | 107040594 A | 8/2017 |

(Continued)

OTHER PUBLICATIONS

Zhu, T., "Cross-broder Remittance Tracing Platform Based on Fabric," Journal of Cyber Security, vol. 3, No. 3, May 2018, with an English abstract, 12 pages.
(Continued)

*Primary Examiner* — Alex Gofman
*Assistant Examiner* — Suman Rajaputra
(74) *Attorney, Agent, or Firm* — Conley Rose, P.C.

(57) ABSTRACT

A blockchain maintenance method adds a target blockchain node group of a first tenant to a channel. In the method, a management node sends new channel configuration information of the channel to an execution node of a second tenant. The execution node of the second tenant generates incremental configuration information of the channel based on the new channel configuration information and old channel configuration information of the channel, and sends the incremental configuration information to a consensus orga- (Continued)

nization. Each blockchain node group that has joined the channel obtains, from the consensus organization, a block including the incremental configuration information, and adds the block to a stored blockchain, to reach a consensus that the target blockchain node group joins the channel. The target blockchain node group is configured based on the incremental configuration information to join the channel.

17 Claims, 7 Drawing Sheets

(51) Int. Cl.
  *G06Q 10/10* (2023.01)
  *G06Q 50/18* (2012.01)
  *H04L 9/32* (2006.01)

(56) References Cited

U.S. PATENT DOCUMENTS

| | | |
|---|---|---|
| 2016/0379212 A1 | 12/2016 | Bowman et al. |
| 2017/0214699 A1 | 7/2017 | Johnsrud |
| 2018/0101560 A1 | 4/2018 | Christidis et al. |
| 2019/0356674 A1* | 11/2019 | Irazabal .................. H04L 63/12 |

FOREIGN PATENT DOCUMENTS

| | | |
|---|---|---|
| CN | 107171829 A | 9/2017 |
| CN | 107483181 A | 12/2017 |
| CN | 107682308 A | 2/2018 |
| CN | 107683489 A | 2/2018 |
| CN | 107947980 A | 4/2018 |
| CN | 109246179 A | 1/2019 |
| WO | 2017148527 A1 | 9/2017 |
| WO | 2018115567 A1 | 6/2018 |

OTHER PUBLICATIONS

Manevich, Y., et al., "Poster: Service Discovery for Hyperledger Fabric," arxiv.org, Cornell University Library, May 5, 2018, 4 pages.

"Adding an Org to a Channel," retrieved from https://hyperledger-fabric.readthedocs.io/en/release-1.2/channel_update_tutorial.html on Sep. 13, 2020, 15 pages.

* cited by examiner

BLOCKCHAIN MAINTENANCE METHOD AND APPARATUS, SERVER, AND COMPUTER-READABLE STORAGE MEDIUM

CROSS-REFERENCE TO RELATED APPLICATIONS

This application is a continuation of International Patent Application No. PCT/CN2019/081181 filed on Apr. 3, 2019, which claims priority to Chinese Patent Application No. 201810806654.1 filed on Jul. 20, 2018 and Chinese Patent Application No. 201810706248.8 filed on Jun. 30, 2018. The disclosures of the aforementioned applications are hereby incorporated by reference in their entireties.

TECHNICAL FIELD

This application relates to the computer field, and in particular, to a blockchain maintenance method and apparatus, a server, and a computer-readable storage medium.

BACKGROUND

A blockchain, or block chain, is a chain data structure jointly maintained by a plurality of peer blockchain nodes in a distributed database. The blockchain may be classified into a public blockchain, a consortium blockchain, and a private blockchain. The public blockchain is a blockchain having no access restriction. Anyone can read and send a transaction that can be effectively confirmed, and participate in a consensus process of the transaction. The private blockchain is a blockchain whose write permission is controlled by an organization. Only a member (which may be an individual or an organization) confirmed by the organization can write data to the blockchain. The consortium blockchain is a blockchain in which a plurality of organizations (hereinafter referred to as members of the consortium blockchain) jointly participate in management. Each member runs one or more nodes, and each node is referred to as a participant of the consortium blockchain. The consortium blockchain allows only nodes in the members to read and send transactions and jointly record transaction data.

The members of both the consortium blockchain and the private blockchain can write data only after obtaining permissions. Therefore, the consortium blockchain and the private blockchain are collectively referred to as a permission chain.

Currently, members of the permission chain are determined by management personnel when the consortium blockchain or the private blockchain is initialized. Adding a new member requires the management personnel to replan or recreate a consortium blockchain or a private blockchain, and implementation is complex.

SUMMARY

In view of this, this application provides a blockchain maintenance method and apparatus, and a server such that a blockchain node group of a new tenant (namely, a member) is dynamically added for blockchain maintenance.

According to a first aspect, this application provides a blockchain maintenance method. In an application scenario of this method, a blockchain node group of a first tenant has not joined a channel for maintaining a blockchain, and a blockchain node group of a second tenant has joined the channel. The method is used to add a target blockchain node group of the first tenant to the channel.

In this method, an execution node of the second tenant receives new channel configuration information, of the channel, that is sent by a management node. The new channel configuration information includes configuration information of the target blockchain node group of the first tenant, configuration information of all blockchain node groups that have joined the channel, and an identifier of the channel. All the blockchain node groups that have joined the channel include the blockchain node group of the second tenant.

The execution node of the second tenant obtains old channel configuration information of the channel, for example, obtains the old channel configuration information of the channel from a consensus node in a consensus organization. The old channel configuration information includes the identifier of the channel and the configuration information of all the blockchain node groups that have joined the channel.

The execution node of the second tenant generates incremental configuration information of the channel. The incremental configuration information includes a difference between the new channel configuration information of the channel and the old channel configuration information of the channel. In an embodiment, the incremental configuration information does not include the configuration information of all the blockchain node groups that have joined the channel, but includes the configuration information of the target blockchain node group of the first tenant. The configuration information of the target blockchain node group is used to configure the target blockchain node group of the first tenant such that the target blockchain node group of the first tenant can join the channel. Therefore, the target blockchain node group of the first tenant participates in maintenance of the blockchain.

The incremental configuration information includes the identifier of the channel. In this way, an execution node of the first tenant determines, based on the identifier of the channel, a to-be-joined channel.

The execution node of the second tenant sends the incremental configuration information to the consensus organization. The consensus organization generates a block including the incremental configuration information. Subsequently, a blockchain node group, of the second tenant, that has joined the channel obtains the block from the consensus organization, and adds the block to a blockchain stored in the blockchain node group. In this way, the incremental configuration information is recorded in the blockchain in a form of a block, to represent that the second tenant agrees to add the target blockchain node group of the first tenant to the channel. A principle is the same as that of adding, by the blockchain node group that is of the second tenant and that has joined the channel, the block to the blockchain stored in the blockchain node group. The blockchain node group that has joined the channel also adds the block to a blockchain stored in another blockchain node group. This represents that another tenant that has the other blockchain node group also agrees to add the target blockchain node group of the first tenant to the channel. Therefore, the first tenant may participate, using the target blockchain node group, in maintenance of the blockchain corresponding to the channel. Subsequently, the target blockchain node group of the first tenant may configure the target blockchain node group based on the incremental configuration information such that the target blockchain node group can join the channel and participate in maintenance of the blockchain corresponding to the channel.

In a possible design of the first aspect, the configuration information of the target blockchain node group includes an operation permission of the target blockchain node group, a permission certificate of the target blockchain node group, and a security algorithm used by the target blockchain node group.

The operation permission of the target blockchain node group is used to configure, for the target blockchain node group, a permission (for example, a read permission/a write permission/a highest permission) to operate data in the blockchain node group.

The permission certificate of the target blockchain node group includes a certificate that manages a highest management permission of the target blockchain node group, a root certificate of the target blockchain node group, and a root certificate used for communication of the target blockchain node group. The target blockchain node group can be operated/accessed only using these permission certificates.

The security algorithm used by the target blockchain node group includes an algorithm (for example, a hash algorithm) for preventing a block from being tampered with. In this way, a transaction record in the block may be prevented from being maliciously modified.

The security algorithm used by the target blockchain node group may further include an algorithm (for example, the hash algorithm) for preventing a transaction record endorsed by the blockchain node group from being tampered with. A transaction record processed using the algorithm is sent to the consensus node, to prevent transaction information in the transaction record from being leaked on the consensus node.

In a possible design of the first aspect, the incremental configuration information further includes a permission policy of the channel. The permission policy of the channel specifies a tenant having a management permission in the channel. Subsequently, the tenant having the management permission may read/write the channel configuration information. The tenant may further invite another tenant to join the channel.

In a possible design of the first aspect, the incremental configuration information further includes a version number of the new channel configuration information and a version number of the old channel configuration information. After the block including the incremental configuration information is added to the blockchain, an old-new change status of the channel may be queried using the blockchain.

In a possible design of the first aspect, for a contract matter that requires the target blockchain node group of the first tenant to participate in endorsement, the execution node of the second tenant updates, in a chaincode used to execute the contract matter, an endorsement policy corresponding to the contract matter. An updated endorsement policy specifies that the target blockchain node group participates in endorsement of a transaction record obtained by executing the contract matter. In this way, the blockchain node group that is of the second tenant and that has joined the channel and the target blockchain node group that is of the first tenant and that has joined the channel participate, at the same time, in the endorsement of the transaction record obtained by executing the contract matter.

According to a second aspect, this application provides a blockchain maintenance method. An application scenario of this method is the same as the application scenario of the method provided in the first aspect.

In this method, a management node instructs an execution node of a first tenant to deploy a blockchain node group used to join a channel. The execution node of the first tenant deploys, in a resource isolation region of the first tenant, a target blockchain node group used to join the channel.

After the target blockchain node group is deployed, the execution node of the first tenant obtains a block including incremental configuration information of the channel, and configures the target blockchain node group of the first tenant based on configuration information, of the target blockchain node group, that is in the incremental configuration information such that the target blockchain node group can join the channel.

After the target blockchain node group joins the channel, a copy of a blockchain may be obtained from a blockchain node group of another tenant that has joined the channel, and the copy of the blockchain is stored in the target blockchain node group. Further, the target blockchain node group may add, to the stored blockchain, the block including the incremental configuration information of the channel. Subsequently, the target blockchain node group and the other blockchain node group that has joined the channel jointly participate in maintenance of the blockchain.

In a possible design of the second aspect, an execution node of a second tenant sends the incremental configuration information to a consensus organization. The consensus organization may generate the block including the incremental configuration information. The execution node of the first tenant obtains, from the consensus organization, the block including the incremental configuration information. In this way, the execution node of the first tenant may use the incremental configuration information to configure the target blockchain node group.

In a possible design of the second aspect, the configuration information of the target blockchain node group further includes an operation permission of the target blockchain node group, a permission certificate of the target blockchain node group, and a security algorithm used by the target blockchain node group. For detailed descriptions of the configuration information of the target blockchain node group, refer to related descriptions of the possible designs in the first aspect.

In a possible design of the second aspect, the incremental configuration information further includes a permission policy of the channel. The permission policy of the channel specifies a tenant having a management permission in the channel. Subsequently, the tenant having the management permission may read/write the channel configuration information. The tenant may further invite another tenant to join the channel.

In a possible design of the second aspect, the incremental configuration information further includes a version number of new channel configuration information and a version number of old channel configuration information. After the block including the incremental configuration information is added to the blockchain, an old-new change status of the channel may be queried using the blockchain.

In a possible design of the second aspect, for a contract matter that requires the target blockchain node group of the first tenant to participate in endorsement, the execution node of the first tenant updates, in a chaincode used to execute the contract matter, an endorsement policy corresponding to the contract matter. An updated endorsement policy specifies that the target blockchain node group participates in endorsement of a transaction record obtained by executing the contract matter. In this way, after joining the channel, the target blockchain node group may participate in the endorsement of the transaction record obtained by executing the contract matter.

According to a third aspect, this application provides a blockchain maintenance method. An application scenario of this method is the same as the application scenario of the method provided in the first aspect or the second aspect.

A management node instructs an execution node of a first tenant to deploy, in a resource isolation region of the first tenant, a blockchain node group used to join a channel. Correspondingly, the execution node of the first tenant deploys the target blockchain node group in the resource isolation region of the first tenant.

The management node obtains new channel configuration information of the channel. The new channel configuration information includes configuration information of the target blockchain node group, configuration information of all blockchain node groups that have joined the channel, and an identifier of the channel. All the blockchain node groups that have joined the channel include a blockchain node group of a second tenant.

The management node sends the new channel configuration information to an execution node of the second tenant. The execution node of the second tenant obtains old channel configuration information from a consensus organization, and generates incremental configuration information based on the new channel configuration information and the old channel configuration information of the channel. The incremental configuration information includes a difference between the new channel configuration information of the channel and the old channel configuration information of the channel. In an embodiment, the incremental configuration information does not include the configuration information of all the blockchain node groups that have joined the channel, but includes the configuration information of the target blockchain node group of the first tenant.

The management node instructs the execution node of the first tenant to configure the target blockchain node group of the first tenant based on the incremental configuration information of the channel such that the target blockchain node group of the first tenant can join the channel. Therefore, the target blockchain node group of the first tenant participates in maintenance of the blockchain.

In a possible design of the third aspect, the management node instructs the execution node of the first tenant to obtain, from a consensus organization, a block including the incremental configuration information.

Specifically, after the execution node of the second tenant sends the incremental configuration information to the consensus organization, the consensus organization may generate the block including the incremental configuration information. Therefore, the execution node of the first tenant obtains, from the consensus organization, the block including the incremental configuration information. In this way, the execution node of the first tenant may use the incremental configuration information to configure the target blockchain node group.

In a possible design of the third aspect, the configuration information of the target blockchain node group includes an operation permission of the target blockchain node group, a permission certificate of the target blockchain node group, and a security algorithm used by the target blockchain node group. For detailed descriptions of the configuration information of the target blockchain node group, refer to related descriptions of the possible designs in the first aspect.

According to a fourth aspect, this application provides a blockchain maintenance apparatus, including a plurality of functional units. The plurality of functional units are deployed on an execution node of a first tenant such that the execution node of the first tenant is enabled to perform the steps performed by the execution node of the first tenant in the blockchain maintenance method provided in the first aspect, any possible design of the first aspect, the second aspect, any possible design of the second aspect, the third aspect, or any possible design of the third aspect.

This application provides another blockchain maintenance apparatus, including a plurality of functional units. The plurality of functional units are deployed on an execution node of a second tenant such that the execution node of the second tenant is enabled to perform the steps performed by the execution node of the second tenant in the blockchain maintenance method provided in the first aspect, any possible design of the first aspect, the second aspect, any possible design of the second aspect, the third aspect, or any possible design of the third aspect.

This application further provides another blockchain maintenance apparatus, including a plurality of functional units. The plurality of functional units are deployed on a management node such that the management node is enabled to perform the steps performed by the management node in the blockchain maintenance method provided in the first aspect, any possible design of the first aspect, the second aspect, any possible design of the second aspect, the third aspect, or any possible design of the third aspect.

According to a fifth aspect, this application provides a server. The server includes a processor and a memory. The memory stores a computer instruction. The processor executes the computer instruction stored in the memory such that the server is enabled to perform the steps performed by the execution node of the first tenant in the blockchain maintenance method provided in the first aspect, any possible design of the first aspect, the second aspect, any possible design of the second aspect, the third aspect, or any possible design of the third aspect, or the server is enabled to perform the steps performed by the execution node of the second tenant in the blockchain maintenance method provided in the first aspect, any possible design of the first aspect, the second aspect, any possible design of the second aspect, the third aspect, or any possible design of the third aspect, or the server is enabled to perform the steps performed by the management node in the blockchain maintenance method provided in the first aspect, any possible design of the first aspect, the second aspect, any possible design of the second aspect, the third aspect, or any possible design of the third aspect.

In a possible design of the fifth aspect, the computer instruction stored in the memory is used to implement a functional unit in any blockchain maintenance apparatus provided in the fourth aspect.

According to a sixth aspect, a computer-readable storage medium is provided. The computer-readable storage medium stores a computer instruction. When a server of a processor executes the computer instruction, the server performs the steps performed by the execution node of the first tenant in the blockchain maintenance method provided in the first aspect, any possible design of the first aspect, the second aspect, any possible design of the second aspect, the third aspect, or any possible design of the third aspect, or the server performs the steps performed by the execution node of the second tenant in the blockchain maintenance method provided in the first aspect, any possible design of the first aspect, the second aspect, any possible design of the second aspect, the third aspect, or any possible design of the third aspect, or the server performs the steps performed by the management node in the blockchain maintenance method provided in the first aspect, any possible design of the first aspect, the second aspect, any possible design of the second aspect, the third aspect, or any possible design of the third aspect.

In a possible design of the sixth aspect, the computer instruction stored in the computer-readable storage medium is used to implement a functional unit in any blockchain maintenance apparatus provided in the fourth aspect.

According to a seventh aspect, a computer program product is provided. The computer program product includes a computer instruction, and the computer instruction is stored in a computer-readable storage medium. A memory of a server may read the computer instruction from the computer-readable storage medium and execute the computer instruction such that the server is enabled to perform the steps performed by the execution node of the first tenant in the blockchain maintenance method provided in the first aspect, any possible design of the first aspect, the second aspect, any possible design of the second aspect, the third aspect, or any possible design of the third aspect, or the server is enabled to perform the steps performed by the execution node of the second tenant in the blockchain maintenance method provided in the first aspect, any possible design of the first aspect, the second aspect, any possible design of the second aspect, the third aspect, or any possible design of the third aspect, or the server is enabled to perform the steps performed by the management node in the blockchain maintenance method provided in the first aspect, any possible design of the first aspect, the second aspect, any possible design of the second aspect, the third aspect, or any possible design of the third aspect.

In a possible design of the seventh aspect, the computer instruction in the computer program product is used to implement a functional unit in any blockchain maintenance apparatus provided in the fourth aspect.

DESCRIPTION OF EMBODIMENTS

Figure 1:
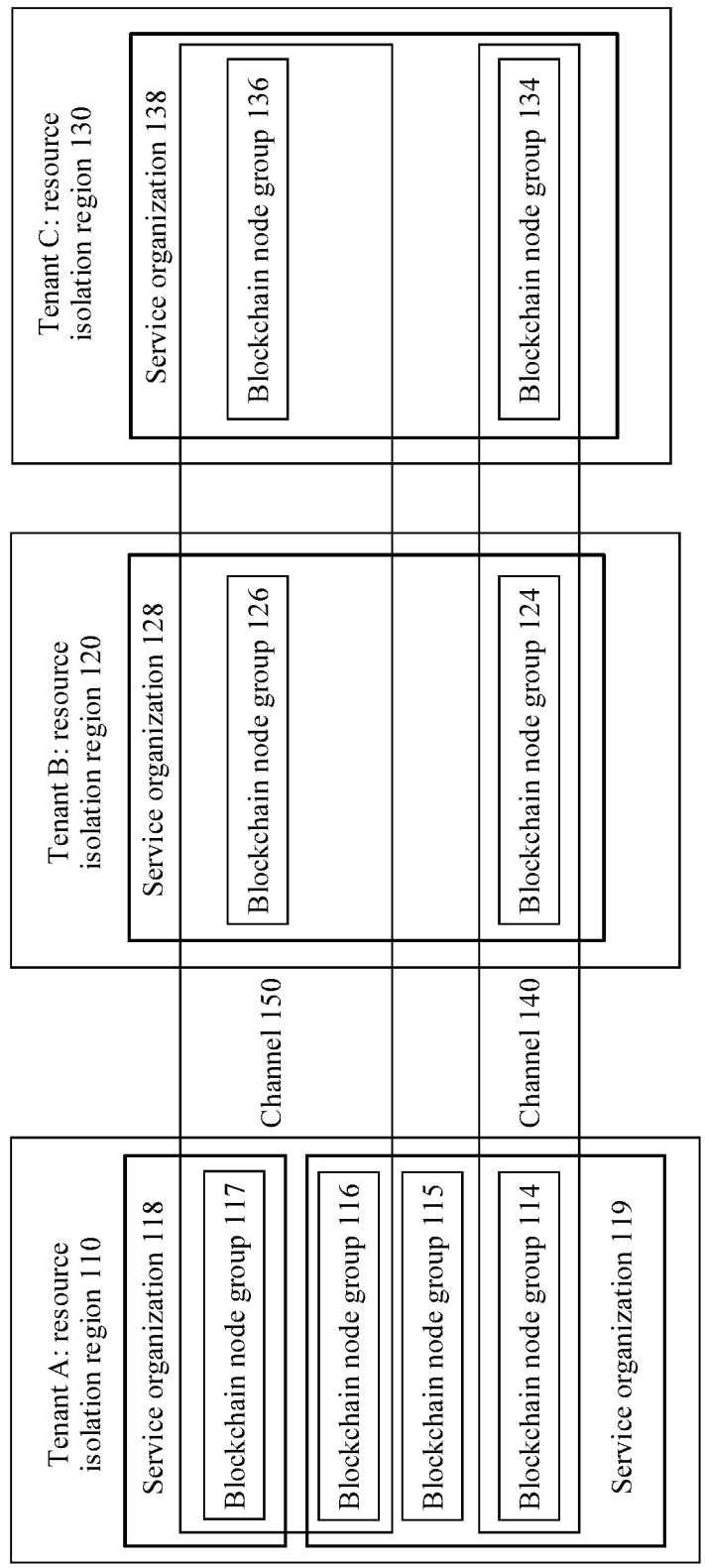
FIG. 1 is a schematic diagram of a channel according to this application.

The following describes technical solutions provided by this application with reference to accompanying drawings.

Terms

A contract is used to record one or more contract matters. Each contract matter stipulates a plurality of participants and a transaction jointly completed by the plurality of participants. For example, a customer transfers money between two banks. The two banks serve as two participants to jointly complete a transfer transaction.

A transaction is any activity or event that can be recorded, for example, a medical event, identity management, document proof, food source tracing, transfer payment, or voting. In this application, when each transaction occurs, a transaction record corresponding to the transaction is generated.

A blockchain may be a chain data structure jointly maintained by a plurality of peer blockchain nodes in a distributed database. Each blockchain stores all transaction records of one or more contracts.

A block is a data unit in a blockchain. Each block records one or more endorsed transaction records. A blockchain is obtained by concatenating a plurality of blocks based on an occurrence sequence. Optionally, each block in the blockchain may usually include a hash value, a timestamp, and a transaction record of a previous block.

A blockchain node is a peer node participating in maintenance of a blockchain. Each blockchain node stores all transaction records of the blockchain.

A member is a manager of a blockchain node, namely, an individual or an organization participating in blockchain management. The member may also be referred to as a user or a tenant, and is collectively referred to as the tenant below. Each tenant has independent resources (for example, a computing resource and a storage resource). All transaction records in one blockchain are stored on a blockchain node of each tenant in the blockchain.

Resource isolation region. When participating in a blockchain, each tenant needs to apply for a specific quantity of resources (including a network resource, a computing resource, a storage resource, and the like) to deploy a blockchain node, where the resources may be leased or self-owned. In this application, resources allocated to each tenant are separately allocated to one resource isolation region. Resource isolation regions of a plurality of tenants are isolated from each other. A tenant cannot access another tenant across resource isolation regions unless otherwise configured.

Service organization. When a tenant provides a service, the tenant may also be referred to a service organization. Optionally, when the tenant is an organization, and different departments of the tenant provide different services, each department of the tenant may also be referred to as a service organization. In an embodiment, in this application, one tenant may have one or more service organizations, and each service organization provides at least one type of service.

A blockchain node group is a structure participating in blockchain management in this application. Each service organization provides one or more blockchain node groups, and each blockchain node group may participate in maintenance of one blockchain.

Channel is a dedicated "subnet" used for communication between two or more tenants to implement a private and confidential transaction and establish a cross-tenant blockchain. In this application, the channel and the blockchain are in a one-to-one correspondence. The channel may be defined by a plurality of members, an anchor peer of each member, a shared ledger (which may also be referred to as a blockchain), a chaincode, and an ordering service node (which may also be referred to as a consensus node).

Consensus. A blockchain is a distributed (decentralized) system, with a traceable and tamper-proof history, that is used to resolve a multi-party mutual trust issue. The distributed system is bound to face a consistency problem, and a process of resolving the consistency problem is referred to as consensus.

Consensus node. Currently, consensus is implemented using a consensus algorithm. A node that executes the consensus algorithm is referred to as a consensus node.

A consensus organization includes all consensus nodes and is used to reach a consensus on and sort transaction records.

A channel according to an embodiment of this application.

FIG. 1 is a schematic diagram of a channel according to an embodiment of this application. In this application, a resource isolation region 110, a resource isolation region 120, and a resource isolation region 130 are respectively allocated to a plurality of tenants (a tenant A, a tenant B, and a tenant C shown in FIG. 1). Generally, resources in the resource isolation region 110, the resource isolation region 120, and the resource isolation region 130 are isolated from each other. Resources in one resource isolation region may be allocated by a public cloud, or may be obtained from a private data center of a corresponding tenant. When the resources in the resource isolation region are allocated by the public cloud, the resource isolation region may be configured as a virtual private cloud (VPC), and resources of different tenants are isolated using different VPCs. When the resources in the resource isolation region are obtained from the private data center of the corresponding tenant, the resources of different tenants are isolated using the data center.

Further, the tenant A includes a service organization 118 and a service organization 119. The tenant B includes a service organization 128, and the tenant C includes a service organization 138. Each service organization deploys at least one blockchain node group based on a service requirement, and each blockchain node group provides or participates in at least one type of service. For example, the service organization 118 deploys a blockchain node group 117. The service organization 119 deploys a blockchain node group 116, a blockchain node group 115, and a blockchain node group 114. The service organization 128 deploys a blockchain node group 124 and a blockchain node group 126. The service organization 138 deploys a blockchain node group 134 and a blockchain node group 136.

In this application, a service organization in each resource isolation region joins a channel at a granularity of a blockchain node group, and access between tenants is implemented using the channel, thereby implementing data transmission between different tenants. In an embodiment, if different blockchain node groups of a plurality of tenants join a same channel, all blockchain node groups in the channel may communicate with each other. For example, in FIG. 1, the blockchain node group 117, the blockchain node group 116, the blockchain node group 126, and the blockchain node group 136 all join a channel 150. In this case, the blockchain node group 117, the blockchain node group 116, the blockchain node group 126, and the blockchain node group 136 may communicate with each other in the channel 150. For another example, in FIG. 1, the blockchain node group 114, the blockchain node group 124, and the blockchain node group 134 all join a channel 140. In this case, the blockchain node group 114, the blockchain node group 124, and the blockchain node group 134 may communicate with each other in the channel 140. Blockchain node groups, of different tenants, that do not join a same channel cannot communicate with each other. All the blockchain node groups in the same channel can manage a same blockchain and view a same transaction record. Whether different blockchain node groups of a same tenant may communicate with each other is configured by the tenant, and is not discussed in this application.

In this application, blockchain node groups of different service organizations of different tenants may join a same channel.

Based on a service requirement, blockchain node groups of different service organizations of a same tenant in this application may join a same channel. For example, the tenant A is a bank, the blockchain node group 117 is deployed in an investment management department (the service organization 118) of the tenant A, and the blockchain node group 116 is deployed in an audit supervision department (the service organization 119) of the tenant A. In this case, both the blockchain node group 117 and the blockchain node group 116 join the channel 150 (a ledger channel, corresponding to a ledger blockchain). Therefore, both the investment management department and the audit supervision department participate in maintenance of the ledger blockchain. The investment management department may write an investment history into the blockchain, and the audit supervision department may verify whether the investment history is legitimate. This increases transaction security.

Certainly, the tenant may alternatively set a blockchain node group of a service organization not to join any channel, but to process only a service of the tenant. For example, the blockchain node group 115 of the tenant A does not join any channel.

In this application, the service organization is used to understand content of this application, and is not an entity participating in blockchain management. Therefore, it may be understood that the service organization is not an essential feature of this application.

A blockchain system according to an embodiment of this application.

Figure 2:
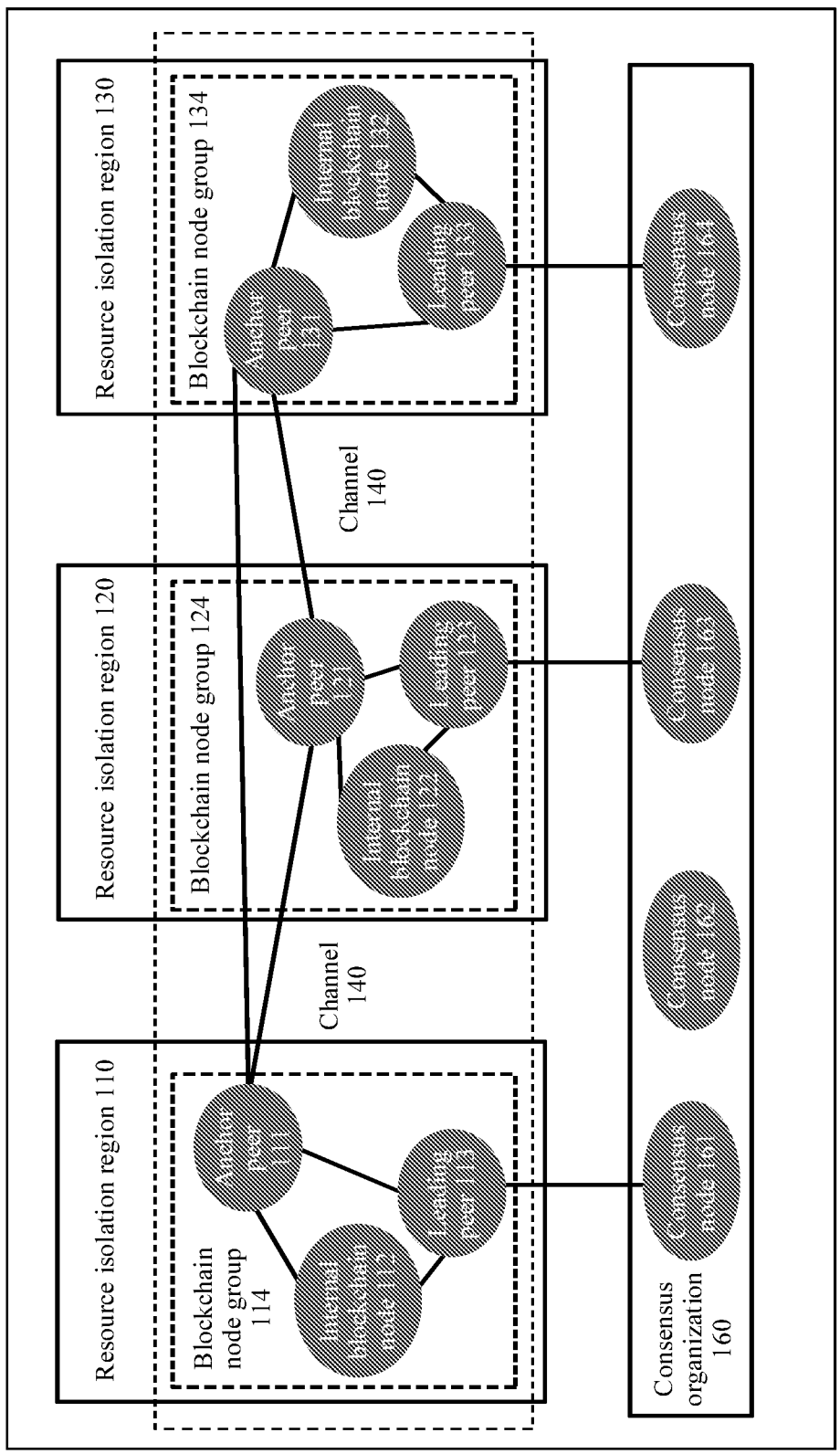
FIG. 2 is a schematic diagram of a blockchain system according to this application.

The following describes a possible blockchain system architecture using an example. As shown in FIG. 2, the blockchain system includes a consensus organization 160 and three blockchain node groups 114, 124, and 134. The three blockchain node groups 114, 124, and 134 simultaneously join a channel 140. As shown in FIG. 2, the blockchain node groups (114, 124, and 134) are respectively deployed in different resource isolation regions.

Each blockchain node group includes three types of blockchain nodes an anchor peer, an internal blockchain node, and a leading peer. The anchor peer is configured to communicate with another blockchain node group in a same channel. The internal blockchain node is configured to store a transaction record. The leading peer is configured to communicate with a consensus node corresponding to the blockchain node group. The anchor peer and the leading peer may further be configured to store the transaction record. FIG. 2 is used as an example. The blockchain node group 114 in a resource isolation region 110 includes an anchor peer 111, an internal blockchain node 112, and a leading peer 113, the blockchain node group 124 in a resource isolation region 120 includes an anchor peer 121, an internal blockchain node 122, and a leading peer 123, and the blockchain node group 134 in a resource isolation region 130 includes an anchor peer 131, an internal blockchain node 132, and a leading peer 133.

Optionally, three types of blockchain nodes in one blockchain node group may be deployed on a same physical device, or may be deployed on different physical devices. In another implementation, a same blockchain node may alternatively undertake two or more functions. The blockchain node group 114 in FIG. 2 is used as an example. Any combination of the anchor peer 111, the internal blockchain node 112, and the leading peer 113 may be deployed on a same physical or logical blockchain node. For example, the anchor peer 111, the internal blockchain node 112, and the leading peer 113 are deployed on a same blockchain node A. In this case, the blockchain node A may communicate with another blockchain node group, store a transaction record, and communicate with a consensus node corresponding to the blockchain node group 114.

That an anchor peer communicates with another blockchain node group in a same channel specifically means that the anchor peer communicates with an anchor peer in the other blockchain node group in the same channel. FIG. 2 is used as an example. The anchor peer 111 may communicate with the anchor peer 121 such that the blockchain node group 114 may communicate with the blockchain node group 124 in the channel 140 using the anchor peer 111. Optionally, peer to peer (P2P) communication is established between anchor peers in a same channel based on a gossip protocol.

When the leading peer in the blockchain node group communicates with the consensus node corresponding to the blockchain node group, the leading peer may obtain a to-be-verified new block from the consensus node. In a same channel, leading peers in different blockchain node groups may be communicatively connected to a same consensus node, or may be separately connected to different consensus nodes. FIG. 2 is used as an example. The leading peer 113 is connected to a consensus node 161. The leading peer 123 is connected to a consensus node 163. The leading peer 133 is connected to a consensus node 164.

The consensus organization 160 includes all the consensus nodes. Each consensus node may receive an endorsed transaction record, and then process the transaction record based on a consensus algorithm with another consensus node in the consensus organization 160, to generate a consensus result for the transaction record. The consensus organization 160 may simultaneously serve a plurality of channels, in an embodiment, separately process transaction records in the plurality of channels based on the consensus algorithm.

After verifying the transaction records, the consensus nodes in the consensus organization 160 may generate a block for one or more transaction records in a same channel. The consensus nodes of the consensus organization 160 may synchronize the block. For example, the consensus node 161 generates a block, and sends copies of the block to a consensus node 162, the consensus node 163, and the consensus node 164. The consensus node 162, the consensus node 163, and the consensus node 164 respectively store the copies received by the consensus node 162, the consensus node 163, and the consensus node 164.

Optionally, the consensus organization 160 is deployed in a public cloud. For example, all the consensus nodes included in the consensus organization 160 are deployed in a resource isolation region in the public cloud.

Each blockchain node group in a channel corresponding to one blockchain stores a blockchain, and is responsible for updating the blockchain stored in the blockchain node group. FIG. 2 is used as an example. The blockchain node group 114, the blockchain node group 124, and the blockchain node group 134 each store one blockchain. The blockchain stored in each of the blockchain node group 114, the blockchain node group 124, and the blockchain node group 134 includes a block generated by executing a same contract. After a new block is generated at the consensus node, the three blockchain node groups 114, 124, and 134 each obtain the new block from the three consensus nodes 161, 163, and 164 respectively connected to the three blockchain node groups 114, 124, and 134, and add the new block to the blockchain stored in each of the blockchain node groups 114, 124, and 134. Therefore, if a blockchain stored in a blockchain node group is not maliciously modified, blockchains separately stored in all blockchain node groups in a same channel are the same. If blockchains stored in a few blockchain node groups in the same channel are maliciously modified, the blockchains may be identified according to a rule that a minority subordinate to a majority. For example, if the blockchain node group 114 finds, using the anchor peer 111, that a blockchain stored in the blockchain node group 124 is different from a blockchain stored in the blockchain node group 114, the three blockchain node groups 114, 124, and 134 mutually check the blockchains. If the blockchain stored in the blockchain node group 124 is different from those stored in the blockchain node group 114 and the blockchain node group 134, it is considered that the blockchain stored in the blockchain node group 124 is abnormal. In this way, all the blockchain node groups in the same channel participate in maintenance of one blockchain.

Figure 3:
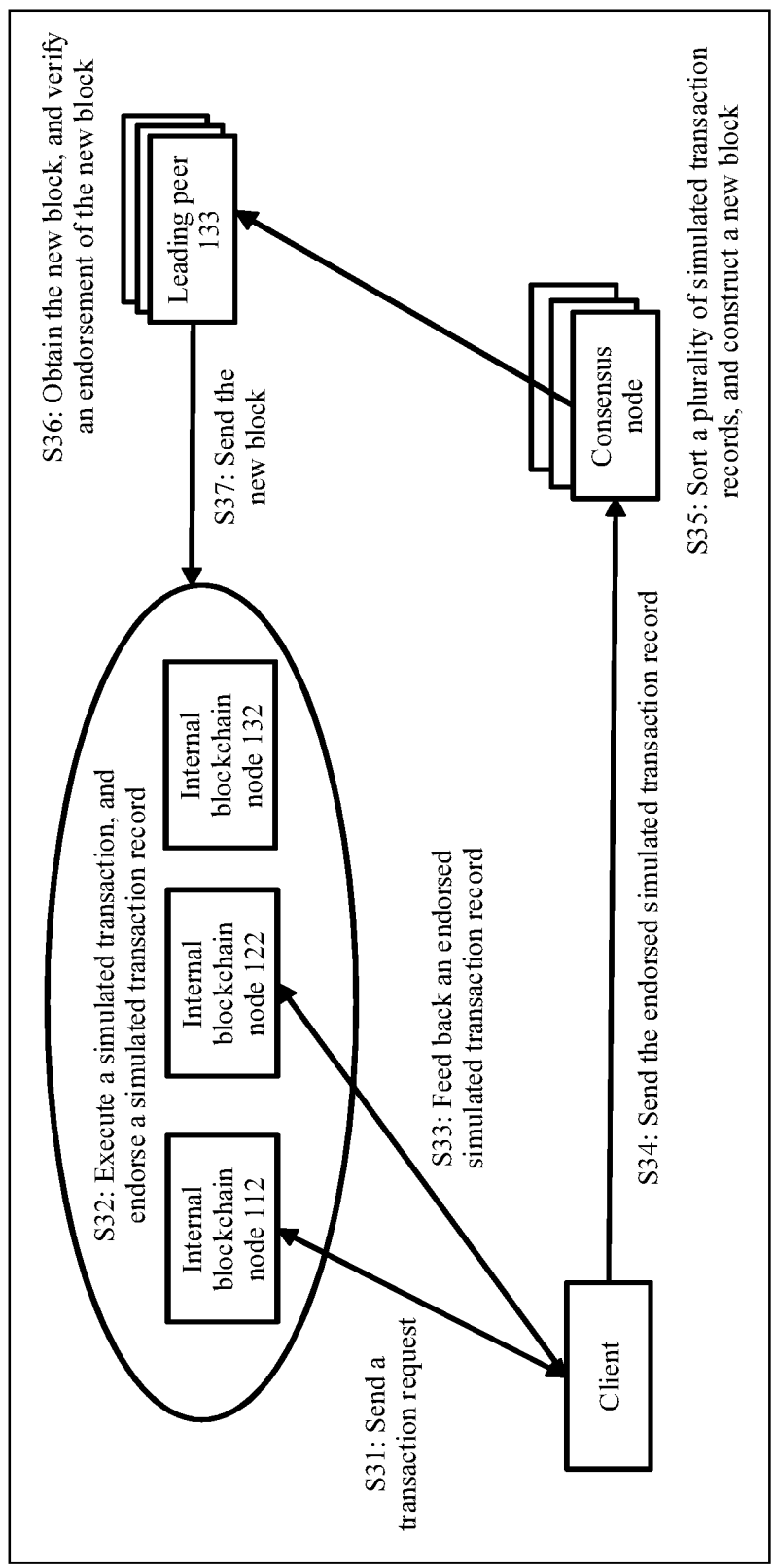
FIG. 3 is a schematic flowchart of a procedure of generating a new block according to this application.

The following describes, with reference to FIG. 3, a procedure of generating a new block according to an embodiment of this application. The procedure includes step S31, step S32, step S33, step S34, step S35, step S36 and step S37.

Step S31. A client sends a transaction request to an internal blockchain node 112 and an internal blockchain node 122.

The transaction request carries an identifier of a channel 140.

The client may access a blockchain node group in the channel 140. Optionally, a management platform delivers, to the client, a permission certificate that may be used to access the blockchain node group in the channel 140. In this way, the client may access the blockchain node group in the channel 140 using the permission certificate.

If participants participating in a current contract matter include a blockchain node group 114 and a blockchain node group 124, the transaction request sent by the client to the internal blockchain node 112 carries a permission certificate used to access the blockchain node group 114, and the transaction request sent by the client to the internal blockchain node 122 carries a permission certificate used to access the blockchain node group 124.

Step S32. The internal blockchain node 112 and the internal blockchain node 122 each simulate execution of a transaction specified in the transaction request, generate a simulated transaction record, and endorse the simulated transaction record.

Specifically, the internal blockchain node 112 and the internal blockchain node 122 each deploy a chaincode corresponding to the transaction, and the internal blockchain node 112 and the internal blockchain node 122 each may execute the chaincode to implement a real transaction. However, in the step S32, the internal blockchain node 112 and the internal blockchain node 122 do not actually execute the real transaction in the chaincode, but simulate execution of the transaction and generate the simulated transaction record. The simulated transaction record includes an execution result of executing the transaction.

The chaincode may specify an endorsement policy used for endorsement of the simulated transaction record of the transaction. The endorsement policy specifies an endorsement organization that participates in endorsement of the simulated transaction record, and the endorsement organization specified in the endorsement policy includes the blockchain node group 114 and the blockchain node group 124. The chaincodes stored in the blockchain node group 114 and the blockchain node group 124 each include the endorsement policy, and the internal blockchain node 112 and the internal blockchain node 122 each endorse the simulated transaction record based on the endorsement policy.

The internal blockchain node 112 and the internal blockchain node 122 each send an endorsed simulated transaction record to the client.

Step S33. The client receives the endorsed simulated transaction records respectively fed back by the internal blockchain node 112 and the internal blockchain node 122.

The client separately receives the endorsed simulated transaction records fed back by the internal blockchain node 112 and the internal blockchain node 122. If only a feedback from either the internal blockchain node 112 or the internal blockchain node 122 is received, the client waits for a feedback from the other blockchain node. After receiving the simulated transaction records respectively fed back by the internal blockchain node 112 and the internal blockchain node 122, the client combines the simulated transaction records respectively fed back by the internal blockchain node 112 and the internal blockchain node 122 into one simulated transaction record. Therefore, the combined simulated transaction record includes endorsement of the internal blockchain node 112 and endorsement of the internal blockchain node 122. Subsequently, the client sends the combined simulated transaction record to a consensus node.

Step S34. The client sends the endorsed simulated transaction record to a consensus node of a consensus organization 160.

For a single transaction, after a plurality of endorsed simulated transaction records are combined into one simulated transaction record, the client sends the combined simulated transaction record to the consensus node.

For a plurality of transactions in the channel 140, the client sends a simulated transaction record of each transaction to the consensus node.

Step S35. The consensus node receives the simulated transaction records sent by the client, sorts the received plurality of simulated transaction records of the plurality of transactions, constructs a new block based on the plurality of sorted simulated transaction records, and synchronizes the new block with another consensus node.

The consensus node continuously receives transaction records of the channel 140, for example, receives a plurality of simulated transaction records sent by one client or different clients at different time points. Each time the consensus node receives one simulated transaction record, the consensus organization verifies the simulated transaction record based on a consensus algorithm, and stores, on the consensus node, a verified simulated transaction record. The consensus node sorts all the stored simulated transaction records of the channel 140. For example, the consensus node sorts the plurality of simulated transaction records based on a time point at which each simulated transaction record is received.

Optionally, when the plurality of sorted simulated transaction records of the channel 140 reach a preset data amount, the consensus node constructs a new block including the plurality of sorted simulated transaction records. The new block belongs to the channel 140.

The consensus node in the consensus organization 160 synchronizes the new block. In an embodiment, the consensus node that generates the new block sends a copy of the new block to another consensus node in the consensus organization 160, and the other consensus node stores the copy of the new block.

Step S36. A leading peer in each blockchain node group obtains the new block from a consensus node connected to the leading peer, and verifies endorsement of the new block.

In an implementation, a leading peer 133 in a blockchain node group 134 obtains the new block from a consensus node 164 connected to the leading peer 133, and verifies whether the endorsement of the new block complies with an endorsement policy. A leading peer 113 in the blockchain node group 114 obtains the new block from a consensus node 161 connected to the leading peer 113, and verifies whether the endorsement of the new block complies with the endorsement policy.

Step S37. The leading peer in each blockchain node group sends the new block to an internal blockchain node in the blockchain node group after the new block passes endorsement verification.

In this way, the internal blockchain node adds the new block to a blockchain stored in the blockchain node group, and the simulated transaction records in the new block is converted into real transaction records. In addition, a blockchain node participating in endorsement executes a transaction recorded in the real transaction records in the new block.

For example, the leading peer 133 in the blockchain node group 134 sends the new block to an internal blockchain node 132. The internal blockchain node 132 adds the new block to a blockchain stored in the blockchain node group 134. The leading peer 113 in the blockchain node group 114 sends the new block to the internal blockchain node 112. The internal blockchain node 112 adds the new block to a blockchain stored in the blockchain node group 114, and performs some actions performed by the internal blockchain node 112 in the transaction recorded in the transaction records in the new block. For example, if the transaction is cross-bank transfer, the internal blockchain node 112 is a transferor, and the internal blockchain node 122 is a payee, the internal blockchain node 112 performs a transfer operation.

It is assumed that when the channel 140 is created, a blockchain node group of at least one tenant joins the channel. The at least one tenant includes a tenant A, but does not include a tenant B. Specifically, the blockchain node group 114 of the tenant A has been added to the channel 140, and the tenant B does not have any blockchain node group added to the channel 140. After the channel 140 is created, according to the method provided in this application, the blockchain node group of the tenant B may be added to the channel 140 such that the blockchain node group of the tenant B participates in maintenance of the blockchain.

Figure 4:
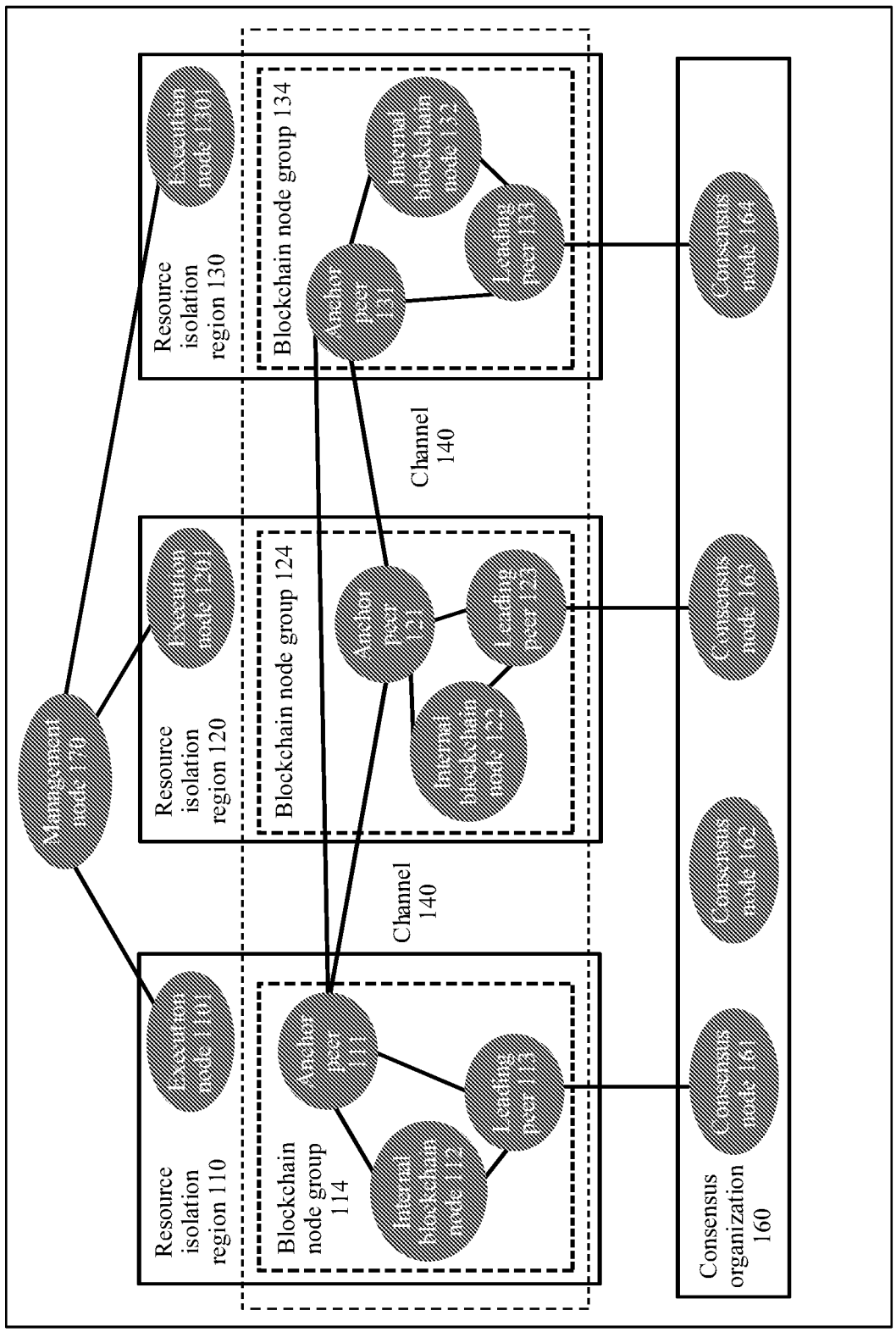
FIG. 4 is another schematic diagram of a blockchain system according to this application.

A possible implementation architecture of adding the blockchain node group of the tenant B to the channel 140 is provided in FIG. 4. As shown in FIG. 4, based on the blockchain system shown in FIG. 2, the architecture further includes a management node 170 configured to manage execution nodes of all tenants. An execution node of a tenant is configured to perform an operation in a resource isolation region of the tenant according to an instruction of a management node, for example, deploy a blockchain node group. The execution node is deployed in the resource isolation region of the tenant. For example, an execution node 1101 of a tenant A is deployed in a resource isolation region 110 of the tenant A.

The management node 170 may be deployed on a management platform. The management platform may be deployed on one server, or may be deployed on a plurality of servers in a distributed manner. The server in this application may be a server in a public cloud, or may be a server in a private cloud. The management node 170 may manage all channels (for example, a channel 140). The management node 170 is communicatively connected to the execution nodes (for example, the execution node 1101, an execution node 1201, and an execution node 1301) of all the tenants such that the management node 170 may manage a blockchain node group of each tenant using an execution node of the tenant.

Figure 5:
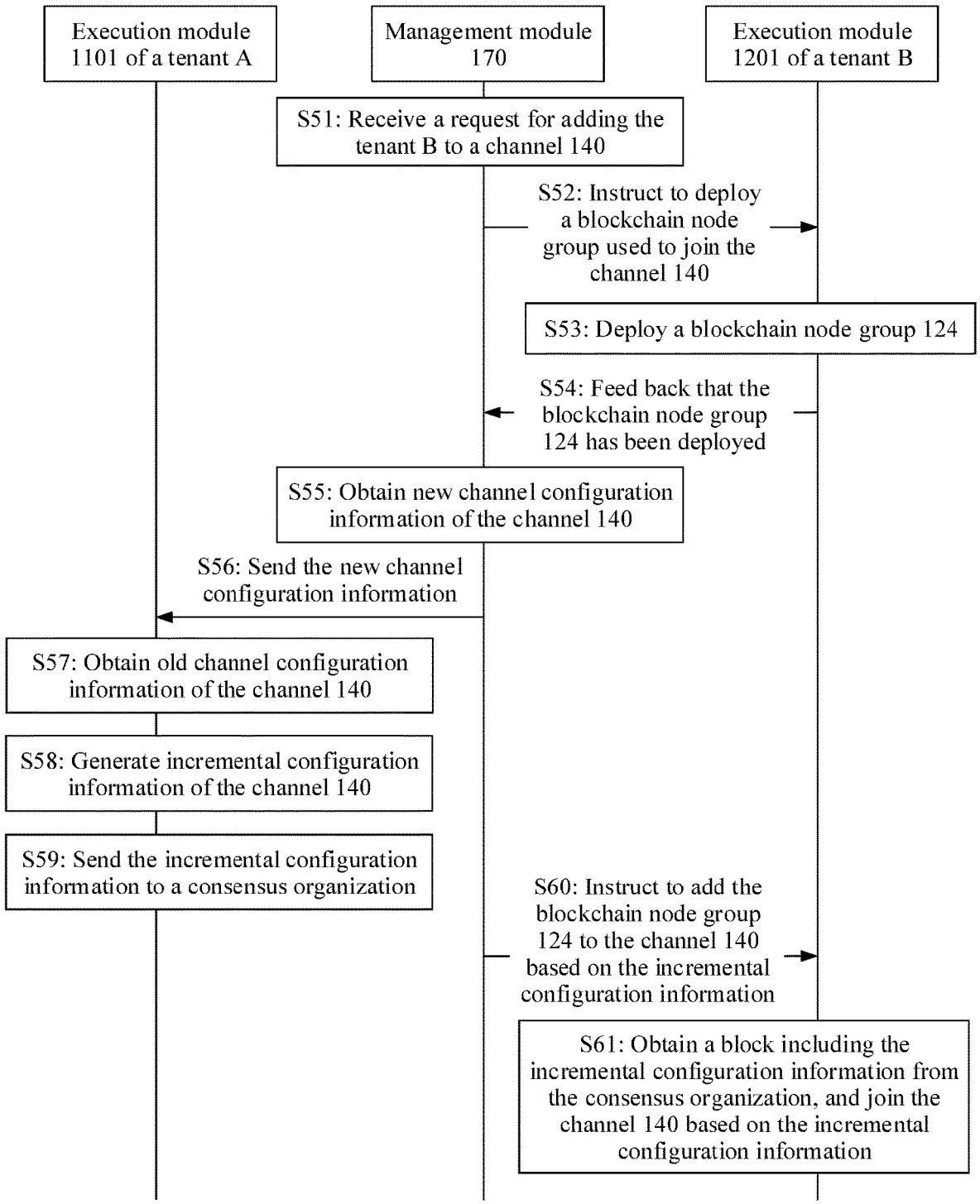
FIG. 5 is a schematic flowchart of a blockchain maintenance method according to this application.

The following describes a blockchain maintenance method provided in this application with reference to FIG. 5. The method is used to add a blockchain node group 124 of a tenant B to a channel 140. The method includes step S51 to step S61.

Step S51. A management node 170 receives a request for adding the tenant B to the channel 140.

The request in the step S51 may include information required for adding the tenant B to the channel 140. In an implementation, the request includes an identifier of the tenant B and an identifier of the channel 140. The request may further include a permission certificate for joining the channel 140. Optionally, the request may further include information about a blockchain maintained by the channel 140, for example, a security algorithm used for maintaining the blockchain by the channel 140, a consensus algorithm supported by the blockchain, and a version number of a HYPERLEDGER Fabric supported by the blockchain. The information for maintaining the blockchain may be sent by the tenant B to the management node 170 through the request. Alternatively, the information for maintaining the blockchain may be stored in the management node 170. In other words, the request may not include the information about the blockchain maintained by the channel 140.

Optionally, the management node 170 may invite the tenant B to join the channel 140. The invitation carries information (for example, the identifier of the tenant B and the identifier of the channel 140) required for adding the tenant B to the channel 140. The tenant B may choose, based on the information, whether to join the channel 140. Based on a choice, the tenant B feeds back to the management node 170 that the invitation is accepted, or feeds back that the tenant B does not join the channel 140.

Optionally, the tenant B may request the management node 170 to add the tenant B to the channel 140. In an implementation, a tenant A sends, to the tenant B, an invitation for joining the channel 140. The invitation includes the information required for adding the tenant B to the channel 140. In response to the invitation, the tenant B sends a request to the management node 170 for joining the channel 140. The request carries the information required for adding the tenant B to the channel 140.

Optionally, when the channel 140 is created, neither the tenant B nor a tenant C joins the channel 140. After the channel 140 is created, if the management node 170 receives the request for adding the tenant B to the channel 140, and further receives a request for adding the tenant C to the channel 140, the management node 170 serially responds to the two requests. For example, the management node 170 first responds to the request for adding the tenant B to the channel 140, and performs the method provided in this application to add the tenant B to the channel 140. Then, the management node 170 responds to the request for adding the tenant C to the channel 140.

In this method, the step S51 is an optional step. The management node 170 may trigger an operation of adding the tenant B to the channel 140 based on a tenant request, or may directly trigger the operation of adding the tenant B to the channel 140.

In this application, adding a tenant to a channel further refers to adding a blockchain node group of the tenant to the channel.

Step S52. The management node 170 instructs an execution node 1201 of the tenant B to deploy, in a resource isolation region 120 of the tenant B, a blockchain node group used to join the channel 140.

The execution node 1201 of the tenant B is deployed in the resource isolation region 120. The execution node 1201 may deploy the blockchain node group in the resource isolation region 120.

A communication connection is established between the management node 170 and the execution node 1201 of the tenant B. In this way, data transmission may be performed between the management node 170 and the execution node 1201. In the step S52, the management node 170 may instruct the execution node 1201 of the tenant B through a message or an instruction. A specific implementation of instructing is not limited herein.

Optionally, the management node 170 responds to the request received in the step S51, and instructs the execution node 1201 of the tenant B to deploy, in the resource isolation region 120 of the tenant B, the blockchain node group used to join the channel 140.

Optionally, in the step S52, when the management node 170 sends, to the execution node 1201 of the tenant B, an instruction for deploying the blockchain node group, the instruction may further carry the information about the blockchain maintained by the channel 140. For example, the information may include one or more of the following the security algorithm used to maintain the blockchain, the consensus algorithm supported by the blockchain, and the version number of the HYPERLEDGER Fabric supported by the blockchain. In this way, the execution node 1201 of the tenant B may deploy, based on the information about the blockchain, a blockchain node group suitable for maintaining the blockchain.

Step S53. The execution node 1201 of the tenant B deploys, in the resource isolation region 120 of the tenant B, the blockchain node group 124 used to join the channel 140.

A manner of deploying the blockchain node group 124 may include two implementations. Implementation 1. The blockchain node group 124 is newly created in the resource isolation region 120. For example, a new container is deployed in the resource isolation region 120, and the new container runs an instance that provides the blockchain node group 124. Implementation 2. If one or more blockchain node groups have been deployed in the resource isolation region 120, a blockchain node group is selected from the one or more deployed blockchain node groups, and the selected blockchain node group is used as the blockchain node group 124 added to the channel 140.

Specifically, the blockchain node group 124 deployed by the execution node 1201 of the tenant B in the resource isolation region 120 includes an anchor peer 121, an internal blockchain node 122, and a leading peer 123.

After deploying the blockchain node group 124, the execution node 1201 runs the blockchain node group 124.

Step S54. The execution node 1201 of the tenant B feeds back, to the management node 170, that the blockchain node group 124 used to join the channel 140 has been deployed.

In an implementation, the execution node 1201 of the tenant B may send a message to the management node 170. The message includes an identifier of the blockchain node group 124, and the message indicates that the blockchain node group 124 is the blockchain node group used by the tenant B to join the channel 140.

In an implementation, the management node 170 located on a management platform may directly query the identifier of the blockchain node group 124, and find that the blockchain node group 124 is the blockchain node group used by the tenant B to join the channel 140.

In this method, the step S54 is an optional step of this application. The management node 170 may perform a step S55 after the execution node 1201 of the tenant B feeds back that the blockchain node group 124 has been deployed. In other words, a feedback of the execution node 1201 may trigger the step S55. In addition, the management node 170 may perform the step S55 while waiting for the feedback from the execution node 1201. Alternatively, the management node 170 may directly perform the step S55 without waiting for the feedback from the execution node 1201.

Step S55. The management node 170 obtains new channel configuration information of the channel 140.

The channel configuration information in this application may include the identifier of the channel 140, and may further include configuration information of all blockchain node groups included in the channel 140.

Optionally, configuration information of each blockchain node group includes an operation permission of the blockchain node group, a permission certificate of the blockchain node group, and a security algorithm used by the blockchain node group.

The operation permission of the blockchain node group includes a highest management permission of the blockchain node group, and a read permission and a write permission for operating data in the blockchain node group. In an implementation, the new channel configuration information is used to instruct to configure a highest management permission of the blockchain node group 124 for the blockchain node group 124. The new channel configuration information is used to instruct to configure, for the blockchain node group 124, a read permission and a write permission for reading/writing data in the blockchain node group 124. In this way, the blockchain node group 124 may read/write a blockchain managed by the blockchain node group 124.

Optionally, the permission certificate of the blockchain node group includes a certificate that manages the highest management permission of the blockchain node group, a root certificate of the blockchain node group, and a root certificate used for communication of the blockchain node group. Optionally, the root certificate of the blockchain node group is a permission certificate used by a client to access the blockchain node group. Optionally, the root certificate used for communication of the blockchain node group may be used to establish a communication connection between an anchor peer, an internal blockchain node, and a leading peer in the blockchain node group, establish a communication connection between the anchor node in the blockchain node group and an anchor peer in another blockchain node group in the channel 140, and establish a communication connection between the leading peer in the blockchain node group and a consensus node. Optionally, the communication connection established based on the root certificate used for communication of the blockchain node group is a communication connection that needs to be authenticated using the root certificate. Optionally, the root certificate used for communication of the blockchain node group may be a root certificate used for communication based on a Transport Layer Security (TLS) protocol.

The security algorithm used by the blockchain node group includes an algorithm (for example, a hash algorithm) for preventing a block from being tampered with. For example, for two adjacent blocks in a blockchain, a hash value of a previous block is calculated using the hash algorithm, and the hash value is stored in a next block. In this way, whether data of the previous block is maliciously modified may be found using the hash value. Optionally, if the blockchain node group further participates in endorsement, the security algorithm used by the blockchain node group further includes an algorithm (for example, the hash algorithm) for preventing a transaction record endorsed by the blockchain node group from being tampered with. Therefore, the consensus node receives, from the blockchain node group, a transaction record processed according to the algorithm, to prevent transaction information in the transaction record from being leaked on the consensus node.

Optionally, the channel configuration information in this application may further include a permission policy of the channel 140.

The permission policy of the channel 140 specifies a tenant having a management permission in the channel 140. For example, the permission policy specifies a tenant having a highest management permission in the channel 140. For example, the permission policy may specify a tenant having a read permission to read the channel configuration information in the channel 140. For example, the permission policy specifies a tenant having a write permission to write the channel configuration information in the channel 140. Optionally, if the tenant A is an initiator of creating the channel 140, the permission policy of the channel 140 may specify that the tenant A has the highest management permission to manage the channel 140, may specify that the tenant A has the read permission to read the channel configuration information, or may specify that the tenant A has the write permission to write the channel configuration information.

Optionally, the channel configuration information in this application may further include a version number of the channel configuration information.

Optionally, the management node 170 may obtain channel configuration information of the channel 140 including all the blockchain node groups. Because the management node 170 instructs the tenant B to deploy the blockchain node group 124, the channel configuration information obtained by the management node 170 includes channel configuration information of the blockchain node group 124. In other words, the channel configuration information obtained by the management node 170 is the new channel configuration information of the channel 140.

Step S56. The management node 170 sends the new channel configuration information to an execution node 1101 of the tenant A.

The execution node 1101 of the tenant A is deployed in a resource isolation region 110.

A communication connection is established between the management node 170 and the execution node 1101 of the tenant A. In this way, data transmission may be performed between the management node 170 and the execution node 1101. Therefore, the management node 170 may send the new channel configuration information to the execution node 1101 of the tenant A.

Step S57. The execution node 1101 of the tenant A receives the new channel configuration information, and obtains old channel configuration information of the channel 140.

The old channel configuration information includes channel configuration information of the channel 140 before the blockchain node group 124 joins the channel 140. It may be learned that the old channel configuration information includes configuration information of all blockchain node groups that have joined the channel 140, but the old channel configuration information does not include configuration information of the blockchain node group 124.

In addition, the old channel configuration information further includes the identifier of the channel 140.

Optionally, the execution node 1101 of the tenant A obtains the old channel configuration information of the channel 140 from a consensus organization 160 using a leading peer 113. For example, the execution node 1101 of the tenant A obtains the old channel configuration information of the channel 140 from a consensus node 161 using the leading peer 113.

Step S58. The execution node 1101 of the tenant A generates incremental configuration information of the channel 140.

The execution node 1101 of the tenant A may calculate a difference between the new channel configuration information of the channel 140 obtained by the management node 170 and the old channel configuration information of the channel 140 obtained by the execution node 1101 of the tenant A, and record the difference in the incremental configuration information. Therefore, the incremental configuration information includes the difference between the new channel configuration information and the old channel configuration information. In an embodiment, the incremental configuration information includes the configuration information of the blockchain node group 124. The incremental configuration information may further include the identifier of the channel 140. Optionally, the incremental configuration information may further include a version number of the new channel configuration information and a version number of the old channel configuration information.

In an implementation, a data structure is provided to record the channel configuration information. The data structure includes the following fields a field recording the identifier of the channel 140, a field recording the configuration information of all the blockchain node groups included in the channel 140, a field recording the permission policy of the channel 140, and a field recording the version numbers. As the difference between the new channel configuration information and the old channel configuration information, the incremental configuration information is still recorded in the data structure. The configuration information, of all the blockchain node groups that have joined the channel 140, in the new channel configuration information is the same as that in the old channel configuration information. Therefore, in the data structure recording the incremental configuration information, a field that records the configuration information of all the blockchain node groups that have joined the channel 140 is empty, and the configuration information of the blockchain node group 124 is recorded. If the permission policy of the channel 140 in the new channel configuration information is also the same as that in the old channel configuration information, the field, in the data structure recording the incremental configuration information, that records the permission policy of the channel 140 is empty. If the permission policy of the channel 140 recorded in the new channel configuration information is different from that recorded in the old channel configuration information, a permission of the tenant B is recorded in the data structure recording the incremental configuration information. The version number of the new channel configuration information and the version number of the old channel configuration information are recorded in the data structure recording the incremental configuration information. The identifier of the channel 140 is recorded in the data structure recording the incremental configuration information.

Step S59. The execution node 1101 of the tenant A sends the incremental configuration information to a consensus organization.

Specifically, the execution node 1101 of the tenant A sends the incremental configuration information to the consensus node 161 connected to the blockchain node group 114.

In this application, the incremental configuration information is used as a transaction record, because a consensus also needs to be reached on the incremental configuration information by the tenants of the channel 140. Specifically, the execution node 1101 of the tenant A sends the incremental configuration information to the leading peer 113, and the leading peer 113 sends the incremental configuration information to the consensus node 161.

The consensus node 161 receives the incremental configuration information, and uses the incremental configuration information as a transaction record. According to a transaction record processing manner, the consensus organization 160 verifies the incremental configuration information according to a consensus algorithm of the channel 140, and the consensus node 161 stores the verified incremental configuration information.

The consensus node 161 generates a block including the incremental configuration information. In a possible implementation, a data amount of the incremental configuration information reaches a data amount for generating one block. In this case, the consensus node 161 generates a block recording only the incremental configuration information. In a possible implementation, the data amount of the incremental configuration information does not reach the data amount for generating one block. In this case, the consensus node 161 generates a block based on the incremental configuration information and another transaction record of the channel 140. In another possible implementation, the data amount of the incremental configuration information exceeds the data amount for generating one block. In this case, the consensus node 161 divides the incremental configuration information among a plurality of blocks. Optionally, when the plurality of blocks are generated, the incremental configuration information is first divided into a plurality of pieces of data based on data amounts required for generating the blocks. Except for the last piece of data, other pieces of data are equal to data amounts required for generating the blocks. Therefore, the last piece of data and the other transaction record of the channel 140 are used to generate a block, and a block is generated for each of the other pieces of data.

Another consensus node of the consensus organization 160 synchronizes the block, generated by the consensus node 161, that includes the incremental configuration information. For example, the consensus node 161 sends a copy of the block to a consensus node 163, and the consensus node 163 stores the block.

Each blockchain node group that has joined the channel 140 may obtain, from a consensus node connected to the blockchain node group, the block including the incremental configuration information, and add the block to a blockchain stored in the blockchain node group. In this way, all the blockchain node groups that have joined the channel 140 reach a consensus that the blockchain node group 124 joins the channel 140. For example, the leading peer 113 of the blockchain node group 114 may obtain, from the consensus node 161, the block including the incremental configuration information, and add the block to a blockchain stored in the blockchain node group 114.

Step S60. The management node 170 instructs the execution node 1201 of the tenant B to add the blockchain node group 124 of the tenant B to the channel 140 based on the incremental configuration information.

The communication connection is established between the management node 170 and the execution node 1201 of the tenant B. In this way, the management node 170 may instruct the execution node 1201 of the tenant B to add the blockchain node group 124 to the channel 140 based on the incremental configuration information. A specific instructing manner is not limited in this application. For example, the management node 170 sends a message to the execution node 1201 of the tenant B, and the message instructs the execution node 1201 of the tenant B to add the blockchain node group 124 to the channel 140 based on the incremental configuration information.

Optionally, when the execution node 1201 adds the blockchain node group 124 to the channel 140 based on the incremental configuration information, the management node 170 further instructs the execution node 1201 of the tenant B to obtain, from the consensus organization, the block including the incremental configuration information. Correspondingly, the execution node 1201 of the tenant B may obtain, using a leading peer 123, the block (including the incremental configuration information) from the consensus node 163 communicatively connected to the leading peer 123.

Step S61. The execution node 1201 of the tenant B obtains the block including the incremental configuration information from the consensus organization, and adds the blockchain node group 124 to the channel 140 based on the incremental configuration information.

Specifically, the execution node 1201 of the tenant B obtains, using the leading peer 123, the block (including the incremental configuration information) from the consensus node 163 that is communicatively connected to the leading peer 123. Optionally, a communication connection between the leading peer 123 and the consensus node 163 is established by the leading peer 123 with the consensus node 163 based on an address request of the consensus node 163. In addition, the communication connection is established without using a root certificate, of the blockchain node group 124, that is used for communication establishment. In an embodiment, the communication connection is not an encrypted communication connection established using the root certificate.

The execution node 1201 of the tenant B configures the blockchain node group 124 based on the configuration information of the blockchain node group 124 in the incremental configuration information. Specifically, the execution node 1201 configures an operation permission of the blockchain node group 124 for the blockchain node group 124. The blockchain node group 124 stores a permission certificate of the blockchain node group 124, and the execution node 1201 configures a highest management permission for the blockchain node group 124 based on the permission certificate. The execution node 1201 configures, for the blockchain node group 124, a function of authenticating a request (for example, a transaction request) for accessing the blockchain node group 124 using the root certificate of the blockchain node group 124. The execution node 1201 configures, for the blockchain node group 124, a function of establishing an internal and external communication connection using the root certificate used by the blockchain node group 124 for communication. The blockchain node group 124 stores a security algorithm used by the blockchain node group 124. The security algorithm may include one or more hash algorithms. The execution node 1201 configures, for the blockchain node group 124, a function of calculating a hash value of a block using a hash algorithm used to prevent the block from being tampered with. The execution node 1201 configures, for the blockchain node group 124, a function of processing an endorsed transaction record using a hash algorithm used to prevent the transaction record from being tampered with.

After the blockchain node group 124 is configured based on the incremental configuration information, the execution node 1201 of the tenant B may perform the following three operations.

Operation 1. The execution node 1201 of the tenant B may instruct the anchor peer 121 to establish a communication connection to an anchor peer (for example, an anchor peer 111 of the blockchain node group 114 of the tenant A) of another blockchain node group that has joined the channel 140 using the root certificate used for communication establishment. After the blockchain node group 124 of the tenant B joins the channel 140, the description point 121 in the blockchain node group 124 of the tenant B may obtain, from the other blockchain node group (for example, the blockchain node group 114), a blockchain that joins the channel 140 before the blockchain node group 124 of the tenant B. Subsequently, the internal blockchain node 122 in the blockchain node group 124 may add, based on the blockchain, a new block obtained from the consensus organization 160.

Operation 2. The execution node 1201 of the tenant B establishes a communication connection between the anchor peer 121, the leading peer 123, and the internal blockchain node 122 using the root certificate used for communication establishment. Subsequently, data transmission may be performed between the anchor peer 121, the leading peer 123, and the internal blockchain node 122. The operation 2 is an optional step of this method. The execution node 1201 of the tenant B may establish the communication connection between the anchor peer 121, the leading peer 123, and the internal blockchain node 122 using the root certificate. Alternatively, the execution node 1201 of the tenant B may establish the communication connection between the anchor peer 121, the leading peer 123, and the internal blockchain node 122 in another manner. In other words, the communication connection between the anchor peer 121, the leading peer 123, and the internal blockchain node 122 is established without using the root certificate.

Operation 3. The execution node 1201 of the tenant B instructs the leading peer 123 to establish a communication connection to the consensus node 163 in the consensus organization 160 using the root certificate used for communication establishment. In this way, the leading peer 123 may obtain, from the consensus node 163, a new block that belongs to the channel 140, and send the new block to the internal blockchain node 122. The internal blockchain node 122 adds the new block to the blockchain. The operation 3 is an optional step of this method. The leading peer 123 may establish an encrypted communication connection to the consensus node 163 using the root certificate. Alternatively, the leading peer 123 may directly establish an unencrypted communication connection to the consensus node 163 without using the root certificate.

Optionally, in the incremental configuration information, the root certificate used by the blockchain node group 124 to establish communication may be a root certificate used for communication based on a TLS.

Optionally, if the permission policy of the channel 140 in the incremental configuration information records the permission of the tenant B, the tenant B is configured based on the permission.

Optionally, after the blockchain node group 124 joins the channel 140, if there is a contract matter that requires the internal blockchain node 122 to participate in endorsement, the blockchain node group 124 updates a chaincode for executing the contract matter. Updating an endorsement policy recorded in the chaincode is included. An updated endorsement policy specifies the blockchain node group 124 and another blockchain node group that needs to participate in the endorsement. The blockchain node group 124 (which may be specifically the internal blockchain node 122) reloads an updated chaincode. In this way, the internal blockchain node 122 endorses, according to the updated endorsement policy, a transaction record obtained by executing the contract matter.

In addition, the other blockchain node group that needs to participate in the endorsement with the blockchain node group 124 at the same time still needs to update a chaincode of the other blockchain node group, and reload a chaincode updated by the other blockchain node group. An endorsement policy recorded by the updated chaincode specifies the blockchain node group 124 and the other blockchain node group. In this way, the other blockchain node group and the blockchain node group 124 may participate in the endorsement at the same time.

Optionally, to update the endorsement policy of the contract matter, the chaincode used to execute the contract matter may be manually updated, rather than be updated by the execution node of the tenant. The chaincode includes the endorsement policy.

Apparatus

This application provides a blockchain maintenance apparatus. The apparatus may be an execution node 1101 of a second tenant (tenant A) described in this application. Functional units included in the apparatus is configured to implement the steps performed by the execution node of the second tenant in the blockchain maintenance method. How to divide the functional units in the apparatus is not limited in this application. The following provides an example of division into the functional units, as shown in FIG. 6.

Figure 6:
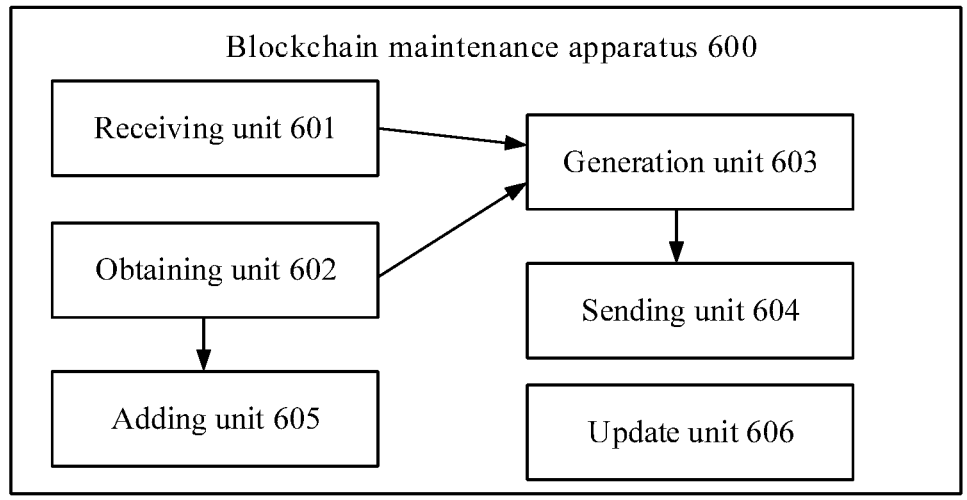
FIG. 6 is a schematic diagram of a logical structure of a blockchain maintenance apparatus 600 according to this application.

A blockchain maintenance apparatus 600 shown in FIG. 6 includes a receiving unit 601 configured to receive new channel configuration information, of a channel, that is sent by a management node 170, where the channel corresponds to one blockchain, and the new channel configuration information includes configuration information of a target blockchain node group 124 that is of a first tenant (tenant B) and that is used to join the channel, configuration information of all blockchain node groups (which include the blockchain node group 114 of the tenant A) that have joined the channel 140, and an identifier of the channel, an obtaining unit 602 configured to obtain old channel configuration information of the channel, where the old channel configuration information includes the identifier of the channel and the configuration information of all the blockchain node groups that have joined the channel, a generation unit 603 configured to generate incremental configuration information of the channel based on the new channel configuration information and the old channel configuration information, where the incremental configuration information includes the identifier of the channel and the configuration information of the target blockchain node group, but the incremental configuration information does not include the configuration information of all the blockchain node groups that have joined the channel, a sending unit 604 configured to send the incremental configuration information to a consensus organization 160, where the obtaining unit 602 is configured to obtain, from the consensus organization, a block including the incremental configuration information, and an adding unit 605 configured to add the block to a blockchain stored in a blockchain node group that has joined the channel.

Optionally, the configuration information of the target blockchain node group further includes an operation permission of the target blockchain node group, a permission certificate of the target blockchain node group, and a security algorithm used by the target blockchain node group.

Optionally, the apparatus 600 includes an update unit 606 configured to, for a contract matter that requires the target blockchain node group to participate in endorsement, update, in a chaincode used to execute the contract matter, an endorsement policy corresponding to the contract matter, where an updated endorsement policy specifies that the target blockchain node group participates in endorsement of a transaction record obtained by executing the contract matter.

This application provides a blockchain maintenance apparatus. The apparatus may be an execution node 1201 of a first tenant (tenant B) described in this application. Functional units included in the apparatus is configured to implement the steps performed by the execution node of the first tenant in the blockchain maintenance method. How to divide the functional units in the apparatus is not limited in this application. The following provides an example of division into the functional units, as shown in FIG. 7.

Figure 7:
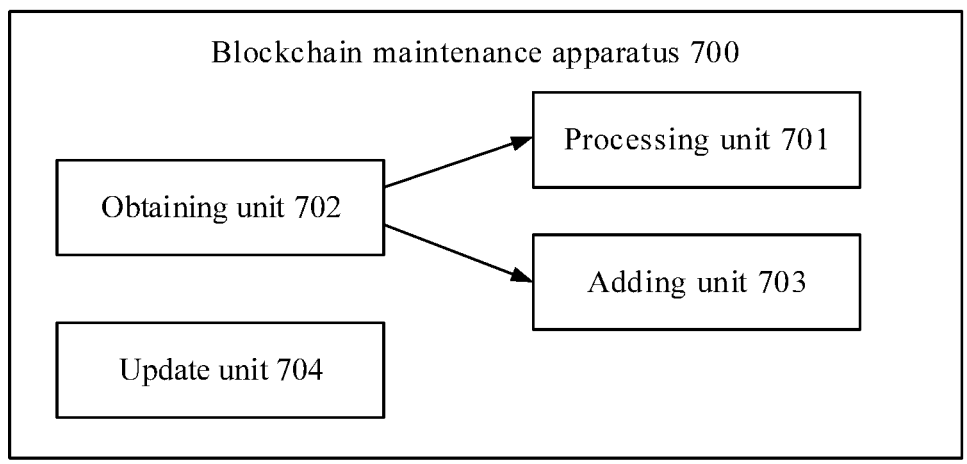
FIG. 7 is a schematic diagram of a logical structure of a blockchain maintenance apparatus 700 according to this application.

The blockchain maintenance apparatus 700 shown in FIG. 7 includes a processing unit 701 configured to deploy, in a resource isolation region 120 of a first tenant (tenant B), a target blockchain node group 124 used to join a channel 140, where the channel corresponds to one blockchain, an obtaining unit 702 configured to obtain a block including incremental configuration information of the channel, where the incremental configuration information includes an identifier of the channel and configuration information of the target blockchain node group of the first tenant, but the incremental configuration information does not include configuration information of all blockchain node groups that have joined the channel, and the processing unit 701 is configured to add the target blockchain node group of the first tenant to the channel based on the incremental configuration information, and an adding unit 703 configured to add the block to a blockchain stored in the target blockchain node group.

Optionally, the obtaining unit 702 is configured to obtain, from a consensus organization 160, the block including the incremental configuration information.

Optionally, the configuration information of the target blockchain node group includes an operation permission of the target blockchain node group, a permission certificate of the target blockchain node group, and a security algorithm used by the target blockchain node group.

Optionally, the processing unit 701 is configured to create the target blockchain node group of the first tenant in the resource isolation region of the first tenant, or determine, from a created blockchain node group in the resource isolation region of the first tenant, the target blockchain node group used to join the channel.

Optionally, the apparatus 700 includes an update unit 704 configured to, for a contract matter that requires the target blockchain node group to participate in endorsement, update, in a chaincode used to execute the contract matter, an endorsement policy corresponding to the contract matter, where an updated endorsement policy specifies that the target blockchain node group participates in endorsement of a transaction record obtained by executing the contract matter.

This application provides a blockchain maintenance apparatus. The apparatus may be the management node 170 described in this application. Functional units included in the apparatus is configured to implement the steps performed by the management node in the blockchain maintenance method. How to divide the functional units in the apparatus is not limited in this application. The following provides an example of division into the functional units, as shown in FIG. 8.

Figure 8:
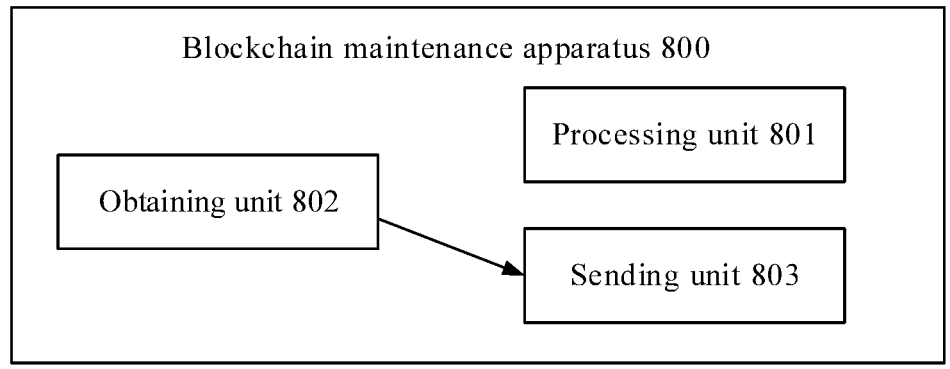
FIG. 8 is a schematic diagram of a logical structure of a blockchain maintenance apparatus 800 according to this application.

The blockchain maintenance apparatus 800 shown in FIG. 8 includes a processing unit 801 configured to instruct an execution node 1201 of a first tenant (tenant B) to deploy, in a resource isolation region 120 of the first tenant, a target blockchain node group 124 used to join a channel 140, where the channel corresponds to one blockchain, an obtaining unit 802 configured to obtain new channel configuration information of the channel, where the new channel configuration information includes configuration information of the target blockchain node group, configuration information of all blockchain node groups that have joined the channel, and an identifier of the channel, and all the blockchain node groups that have joined the channel include a blockchain node group 114 of a second tenant (tenant A), and a sending unit 803 configured to send the new channel configuration information to an execution node 1101 of the second tenant.

The processing unit 801 is configured to instruct the execution node of the first tenant to add the target blockchain node group of the first tenant to the channel based on incremental configuration information of the channel. The incremental configuration information includes the identifier of the channel and the configuration information of the target blockchain node group. The incremental configuration information does not include the configuration information of all the blockchain node groups that have joined the channel. The incremental configuration information is obtained based on the new channel configuration information and old channel configuration information of the channel. The old channel configuration information includes the identifier of the channel and the configuration information of all the blockchain node groups that have joined the channel.

Optionally, the processing unit 801 is configured to instruct the execution node of the first tenant to obtain, from a consensus organization 160, a block including the incremental configuration information.

Optionally, the configuration information of the target blockchain node group includes an operation permission of the target blockchain node group, a permission certificate of the target blockchain node group, and a security algorithm used by the target blockchain node group.

Figure 9:
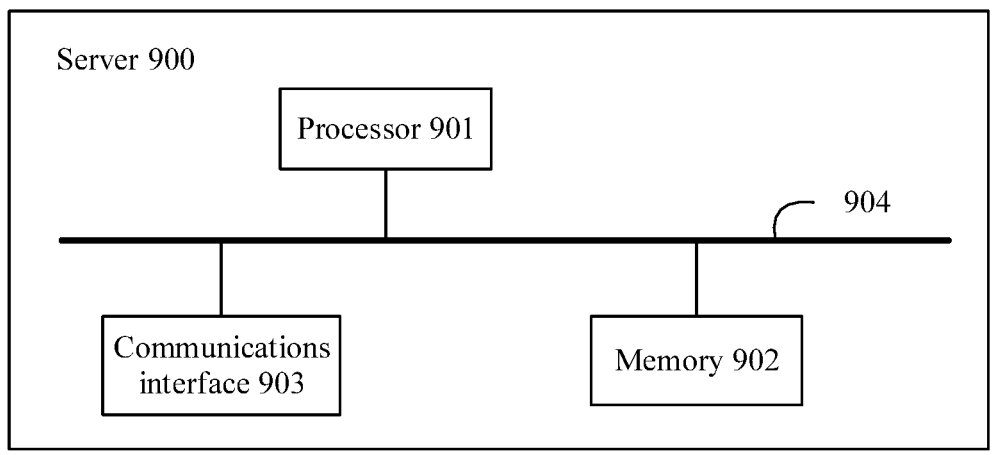
FIG. 9 is a schematic diagram of a hardware structure of a server 900 according to this application.

An execution node (for example, the execution node of the first tenant or the execution node of the second tenant) or a management node of a tenant may be deployed on one server, or may be deployed on a plurality of servers in a distributed manner. The execution node or the management node of the tenant may be deployed on a same server or different servers. As shown in FIG. 9, the following provides an example of a possible basic hardware architecture of the server.

Refer to FIG. 9. A server 900 includes a processor 901, a memory 902, a communications interface 903, and a bus 904.

On the server 900, there may be one or more processors 901. FIG. 9 shows only one of the processors 901. Optionally, the processor 901 may be a central processing unit (CPU) or an advanced reduced instruction set computing (RISC) Machine (ARM) processor. If the server 900 includes a plurality of processors 901, the plurality of processors 901 may be of a same type or different types. Optionally, the plurality of processors 901 on the server 900 may be integrated into a multi-core processor.

The memory 902 stores a computer instruction. For example, the computer instruction includes a chaincode. For example, the computer instruction is used to implement the steps in the method provided in this application. For example, the computer instruction is used to implement the functional units included in the apparatus 600, the apparatus 700, or the apparatus 800 provided in this application.

The memory 902 may be any one or any combination of the following storage media a non-volatile memory (NVM) (for example, a read-only memory (ROM), a solid-state drive (SSD), a hard disk drive (HDD), a magnetic disk, or a magnetic disk array), and a volatile memory.

The communications interface 903 may be any one or any combination of the following components with a network access function, such as a network interface (for example, an Ethernet interface) and a wireless network interface card.

The communications interface 903 is configured to perform data communication between the server 900 and another device (for example, a server).

A thick line is used to represent the bus 904 in FIG. 9. The processor 901, the memory 902, and the communications interface 903 are connected using the bus 904. In this way, the processor 901 may access the memory 902 using the bus 904, and exchange data with the other device (for example, the server) through the communications interface 903 using the bus 904.

Optionally, the server 900 executes the computer instruction in the memory 902, to implement, on the server 900, the steps performed by the execution node or the steps performed by the management node in the blockchain maintenance method provided in this application, or implement, on the server 900, the apparatus 600, the apparatus 700, or the apparatus 800 provided in this application.

This application provides a computer-readable storage medium. The computer-readable storage medium stores a computer instruction. When a processor 901 of a server 900 executes the computer instruction, the server 900 performs the steps performed by the execution node of the first tenant in the blockchain maintenance method provided in this application, performs the steps performed by the execution node of the second tenant in the method, or performs the steps performed by the management node in the method.

This application provides a computer-readable storage medium. The computer-readable storage medium stores a computer instruction, and the computer instruction is used to implement the apparatus 600, the apparatus 700, or the apparatus 800.

This application provides a computer program product. The computer program product includes a computer instruction, and the computer instruction is stored in a computer-readable storage medium. A processor of a server may read the computer instruction from the computer-readable storage medium and execute the computer instruction such that the server is enabled to perform the steps performed by the execution node of the first tenant in the blockchain maintenance method provided in this application, perform the steps performed by the execution node of the second tenant in the method, or perform the steps performed by the management node in the method.

This application provides a computer program product. A computer instruction included in the computer program product is used to implement the apparatus 600, the apparatus 700, or the apparatus 800.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the protection scope of the technical solutions of the embodiments of the present disclosure.

What is claimed is:

1. A blockchain maintenance method, implemented by an execution node of a tenant, wherein the blockchain maintenance method comprises:
receiving new channel configuration information of a channel from a management node, wherein the channel corresponds to a blockchain, wherein the new channel configuration information comprises first configuration information of a target blockchain node group that is of another tenant and that joins the channel, second configuration information of a plurality of blockchain node groups of the channel, and an identifier of the channel, and wherein the first configuration information further comprises an operation permission of the target blockchain node group, a permission certificate of the target blockchain node group, and a security algorithm for use by the target blockchain node group;
obtaining old channel configuration information of the channel, wherein the old channel configuration information comprises the identifier and the second configuration information;
generating incremental configuration information of the channel based on the new channel configuration information and the old channel configuration information, wherein the incremental configuration information comprises the identifier and the first configuration information, and wherein the incremental configuration information does not comprise the second configuration information;
sending the incremental configuration information to a consensus organization;
obtaining a block comprising the incremental configuration information from the consensus organization;
adding the block to a blockchain in one of the blockchain node groups of the channel; and
updating an endorsement policy corresponding to a contract matter in a chaincode for executing the contract matter that requires the target blockchain node group to participate in an endorsement, wherein an updated endorsement policy specifies that the target blockchain node group participates in the endorsement of a transaction record in response to executing the contract matter.

2. The blockchain maintenance method of claim 1, wherein the security algorithm comprises a hash algorithm.

3. A blockchain maintenance method, comprising:
deploying, by an execution node of a first tenant, a target blockchain node group to join a channel in a resource isolation region of the first tenant, wherein the channel corresponds to a blockchain;
obtaining, by the execution node, a block comprising incremental configuration information of the channel from a consensus organization, wherein the incremental configuration information comprises an identifier and first configuration information of the target blockchain node group of the first tenant, and wherein the incremental configuration information does not comprise second configuration information of all blockchain node groups of the channel;
adding, by the execution node, the target blockchain node group of the first tenant to the channel based on the incremental configuration information;
adding, by the execution node, the block to a blockchain in the target blockchain node group;
instructing, by a management node, the execution node to deploy the target blockchain node group used to join the channel in the resource isolation region of the first tenant;
obtaining, by the management node, new channel configuration information of the channel, wherein the new channel configuration information comprises the first configuration information, the second configuration information, and the identifier, and wherein all the blockchain node groups of the channel comprise a blockchain node group of a second tenant;
sending, by the management node, the new channel configuration information to a second execution node of the second tenant; and
instructing, by the management node, the execution node to add the target blockchain node group of the first tenant to the channel based on the incremental configuration information of the channel, wherein the incremental configuration information is based on the new channel configuration information and old channel configuration information of the channel, and wherein the old channel configuration information comprises the identifier and the second configuration information.

4. The blockchain maintenance method of claim 3, further comprising creating, by the execution node, the target blockchain node group of the first tenant in the resource isolation region of the first tenant.

5. The blockchain maintenance method of claim 3, further comprising determining, by the execution node, the target blockchain node group used to join the channel from a created blockchain node group in the resource isolation region of the first tenant.

6. The blockchain maintenance method of claim 3, further comprising updating, by the execution node, an endorsement policy corresponding to a contract matter in endorsement in a chaincode used to execute the contract matter for the contract matter that requires the target blockchain node group to participate, wherein an updated endorsement policy specifies that the target blockchain node group participates in endorsement of a transaction record in response to executing the contract matter.

7. The blockchain maintenance method of claim 3, further comprising instructing, by the management node, the execution node to obtain the block comprising the incremental configuration information from the consensus organization.

8. The blockchain maintenance method of claim 3, wherein the first configuration information comprises an operation permission of the target blockchain node group, a permission certificate of the target blockchain node group, and a security algorithm for use by the target blockchain node group.

9. The blockchain maintenance method of claim 8, wherein the security algorithm comprises a hash algorithm.

10. A server, comprising:
a processor; and
a memory coupled to the processor and storing instructions that, when executed by the processor, cause the server to be configured to:
  receive new channel configuration information of a channel from a management node, wherein the channel corresponds to a blockchain, wherein the new channel configuration information comprises first configuration information of a target blockchain node group of a first tenant and that joins the channel, second configuration information of all blockchain node groups of the channel, and an identifier of the channel, and wherein the first configuration information further comprises an operation permission of the target blockchain node group, a permission certificate of the target blockchain node group, and a security algorithm used by the target blockchain node group;
  obtain old channel configuration information of the channel, wherein the old channel configuration information comprises the identifier of the channel and the second configuration information;
  generate incremental configuration information of the channel based on the new channel configuration information and the old channel configuration information, wherein the incremental configuration information comprises the identifier of the channel and the first configuration information, and wherein the incremental configuration information does not comprise the second configuration information;
  send the incremental configuration information to a consensus organization;
  obtain a block comprising the incremental configuration information from the consensus organization;
  add the block to a blockchain in a blockchain node group of the channel; and
  update an endorsement policy corresponding to a contract matter in a chaincode used to execute the contract matter for the contract matter that requires the target blockchain node group to participate in endorsement, and wherein an updated endorsement policy specifies that the target blockchain node group participates in endorsement of a transaction record obtained by executing the contract matter.

11. The server of claim 10, wherein the security algorithm comprises a hash algorithm.

12. A server, comprising:
a processor; and
a memory coupled to the processor and storing instructions that, when executed by the processor, cause the server to be configured to:
  deploy a target blockchain node group to join a channel in a resource isolation region of a first tenant, wherein the channel corresponds to a blockchain;
  obtain a block comprising incremental configuration information of the channel from a consensus organization, wherein the incremental configuration information comprises an identifier of the channel and first configuration information of the target blockchain node group of the first tenant, and wherein the incremental configuration information does not comprise second configuration information of all blockchain node groups of the channel;
  add the target blockchain node group of the first tenant to the channel based on the incremental configuration information;
  add the block to a blockchain in the target blockchain node group;
  instruct, by a management node, the execution node to deploy the target blockchain node group used to join the channel in the resource isolation region of the first tenant;
  obtain, by the management node, new channel configuration information of the channel, wherein the new channel configuration information comprises the first configuration information, the second configuration information, and the identifier, and wherein all the blockchain node groups of the channel comprise a blockchain node group of a second tenant;
  send, by the management node, the new channel configuration information to a second execution node of the second tenant; and
  instruct, by the management node, the execution node to add the target blockchain node group of the first tenant to the channel based on the incremental configuration information of the channel, wherein the incremental configuration information is based on the new channel configuration information and old channel configuration information of the channel, and wherein the old channel configuration information comprises the identifier and the second configuration information.

13. The server of claim 12, wherein the first configuration information comprises an operation permission of the target blockchain node group, a permission certificate of the target blockchain node group, and a security algorithm used by the target blockchain node group.

14. The server of claim 12, wherein the instructions further cause the processor to be configured to create the target blockchain node group of the first tenant in the resource isolation region of the first tenant.

15. The server of claim 12, wherein the instructions further cause the processor to be configured to update an endorsement policy corresponding to a contract matter in a chaincode used to execute the contract matter for the contract matter that requires the target blockchain node group to participate in endorsement, and wherein an updated endorsement policy specifies that the target blockchain node group participates in endorsement of a transaction record in response to executing the contract matter.

16. The server of claim 12, wherein the instructions further cause the processor to be configured to determine the target blockchain node group used to join the channel from a created blockchain node group in the resource isolation region of the first tenant.

17. The server of claim 13, wherein the security algorithm comprises a hash algorithm.

* * * * *